United States Patent [19]

Jermstad

[11] Patent Number: 5,336,290

[45] Date of Patent: Aug. 9, 1994

[54] SEMI-SOLID ACTIVATED SLUDGE BIOREMEDIATION OF HYDROCARBON-AFFECTED SOIL

[76] Inventor: David B. Jermstad, 4080 N. Canyon Rd., Camino, Calif. 95709

[21] Appl. No.: 766,851

[22] Filed: Sep. 27, 1991

[51] Int. Cl.$^5$ .................. C05F 7/00; A01G 11/00; C02F 3/00

[52] U.S. Cl. ........................... 71/13; 71/21; 71/903; 435/262; 47/1.42; 405/128; 210/611

[58] Field of Search .......... 405/128, 129; 71/13, 71/21, 903, 904; 47/1.42; 210/609, 610, 770; 435/262

[56] References Cited

U.S. PATENT DOCUMENTS 5,039,415 8/1991 Smith .................................. 405/128
5,120,160 6/1992 Schwengel ........................ 405/128

FOREIGN PATENT DOCUMENTS 9116153 10/1991 PCT Int'l Appl. ................. 405/128

OTHER PUBLICATIONS

Kosson et al, Microbiol Mineralization of Organic Contaminants on Soil and Soil Fractions, CA: 112(22): 204119m, 1988 (Abstract).

Applied & Environmental Microbiology, Apr. '79, pp. 729–739, Dibble & Bartha, "Effect of Environmental Parameters on the Biodegradation of Oil Sludge".

"Land Treatment of Petroleum Contaminated Soils with Sewage Sludge" Lang et al, Ground Water Consultants, Inc., pp. 443–448 Oct. 31, 19900.

*Primary Examiner*—Ferris Lander
*Attorney, Agent, or Firm*—Stan Jones

[57] ABSTRACT

The invention relates to a method of recycling contaminated soil so as to form a balanced non-contaminated soil with an increased water-holding capability. More particularly the invention combines two waste products, namely hydrocarbon-affected soil and activated sewage sludge, in order to create a useful non-waste product having high marketability. The combination, or mixing, of those waste products is done either by land farming and/or by composting. In the latter case the hydrocarbon-affected soil also acts as an insulating blanket over the compost, and that blanket itself is subsequently added into the compost after the curative process has dissipated the contaminants.

15 Claims, No Drawings

SEMI-SOLID ACTIVATED SLUDGE BIOREMEDIATION OF HYDROCARBON-AFFECTED SOIL

ORIGIN OF THE INVENTION

This invention was conceived, made and developed by a small entity sole inventor named herein.

FIELD OF THE INVENTION

The invention relates to a method of recycling contaminated soil so as to form a balanced non-contaminated soil with an increased water-holding capability. More particularly the invention combines two waste products, namely hydrocarbon-affected soil and activated sewage sludge, in order to create a useful non-waste product having high marketability.

BACKGROUND OF THE INVENTION

This invention results from a novel and non-obvious combination of two well known waste products in order to recycle such waste products into a useful non-waste and marketable soil. It should be understood that these two components, while known abstractly, are in real day-to-day experience, subject to different engineering disciplines. My proposed combination goes against actual practice in the field. The combination of the invention is unusual and is not to be expected in the practical work-a-day world.

In one embodiment the invention land farms the two wastes; and in another embodiment the two wastes are used in a new and novel composting method. In each instance an improved product results from the new and novel teaching of the embodiments as disclosed and claimed herein.

Each one of the waste products and the prior art manner of treating such waste products will briefly be described. In order to promote a clear and definite understanding of my invention, I will now describe some terms that are useful for a fuller understanding of my invention.

1. Activated Sewage Sludge

Activated sewage sludge results from raw sewage being treated in standard sewage plants throughout the world. Such activated sewage sludge is defined as an organic fertilizer made from sewage freed from grit and coarse solids and aerated after being inoculated with microorganisms. The resulting organic matter is withdrawn from the treating tanks, filtered with or without the aid of coagulants, dried, ground and screened.

Current technology for treatment and handling of such sludge includes: (1) land fill disposal; (2) composting in static pile systems, windrow systems and in-vessel systems; and (3) direct-application fertilizing of grain-crop fields. Problems and limitations associated with each of these known techniques will now be briefly discussed.

A. Land Fill

Dumping sludge at land fills is the most prevalent method of disposal because land fills are common to most communities. Nationwide, the Regional Water Quality Control Boards are now implementing the Landfill Disposal Criteria (LDC) which restricts land fill disposal of wastes exceeding fifty percent (50%) liquids. This restrictive LDC becomes effective in October 1991, and sewage sludge will no longer be suitable for land fill disposal (Please see Health and Safety Cede Section 25179.5(b)).

B. Composting

Composting activated sewage sludge is one of several approaches available to the management of municipal waste water-laden sludge. It is a biological process that converts sludge into a stable humus that can be applied to the land as a soil conditioner and a low-grade fertilizer. In composting, the sludge (biomass and water) is mixed with approximately a one to three ratio of sludge to a bulking agent such as, for example, wood chips. The mixture promotes oxygenation in any one of several well known manners. Air moving in or out of the mixture and heat, naturally produced or intentionally added, over a period of several days causes the human pathogens to die out. Thereafter the wood chips are removed and a useful humus has been produced.

During the past decade, an increasing number of municipalities have begun to compost their sludge. Approximately 115 sludge composting facilities are operational in the United States. (Please see, for example, the United States Environmental Protection Agency "USEPA" Seminar Publication entitled "Composting of Municipal Sludge", 1985. ). This prior art sludge composting operation is not economically feasible and most such composting activity is an economic burden to the municipalities. What is needed is a new technology as provided by this invention wherein the composting is not only self-supporting but provides a useful product that is economically viable for the municipalities.

C. Fertilizing Fields

Fertilizing grain-crop fields is an acceptable practice for activated sewage sludge disposal and has been practiced for the last twenty years. A limiting factor with farm application is inherent toxic metal concentrations in the sludge. Toxic metals are, by definition, bioaccumulative and thus are highly regulated in agriculture. Regional Water Quality Control Boards typically allow grain-crop field farmers to utilize activated sludge as a one-time application, or following three to four years between applications. (Please see, for example, USEPA "A Practical Technology-Land Application of Sludge", 1983.)

In summary the prior art ways for treating activated sewerage sludge are both costly and limited in application. None of these applications, generally speaking, are economically viable or self-supporting.

2. Hydrocarbon Affected Soil

Hydrocarbon-affected soil is defined as soil which is subjected to a spill or leak of hydrocarbon-based compounds. Typical examples are refineries, service stations having leaking underground fuel tanks and the like. The resulting contaminated soil often represents a risk to the ground water of the area and is required by the regulatory agency to be treated. Current methods for treatment of hydrocarbon-affected soil include (1) incineration; (2) land fill disposal; (3) volatilization; (4) soil ventilation; and (5) bioremediation. Each of these techniques will now be briefly described.

A. Incineration

Incineration of hydrocarbon-affected soils is increasingly popular because the contaminated soil is quickly treated and can be replaced in the ground. The process raises the core-temperature of a soil reactor to the point of thermal destruction of the contamination in the soil. The process is energy-demanding and highly specialized, thus restricting its widespread use.

B. Land Fill

Land fill disposal requires transportation of the hydrocarbon affected soils to an approved and specially designed facility. In urban areas, the land fills are experiencing a crisis for space to dispose of domestic waste and regulators are becoming increasingly reluctant to accept hydrocarbon-affected soils.

C. Volatilization

Volatilization of hydrocarbon-affected soils was common during the past decade. Recent studies of the volatile fraction of petroleum-hydrocarbons suggest that air emissions of aromatic hydrocarbons represents a significant health hazard to the public. Local Air Resource Boards are currently restricting uncontrolled aeration of hydrocarbon-affected soils (Sacramento Air Resource Board, 1986).

D. SOIL VENTILATION

Soil venting is a process of drawing hydrocarbon vapors from the soil through a filtering media, such as granular activated carbon, and transferring the contamination from the soil onto a concentrating filter. The equipment and disposal requirements are specialized for soil venting.

E. Bioremediation

Bioremediation of hydrocarbon-affected soils is a proven technology which results in the complete destruction of the hydrocarbon products to carbon-dioxide and water. Treatability studies show that degradation of light-fraction hydrocarbons (gasoline and aromatic) occurs within two weeks when the micronutrient and moisture contents are optimized. Heavy-faction hydrocarbons (diesel and kerosene) typically degrade within three months.

Bioremediation of hydrocarbon-affected soil is quickly becoming the preferred method of treatment. Micro-nutrients are adjusted in the soil and the natural soil bacteria proliferate and digest the hydrocarbon. Micro-nutrients include; nitrogen, phosphorus, and potassium. Bioremediation is applicable, however, only at a fraction of sites where there is adequate room to create a land farm for a period of a few months.

In summary, there is a desperate and heretofore unsolved need for an improved soil treatment that will increase the yield of useful non-waste balanced soil. This invention fills that need and has the added benefit of recycling two waste products into a beneficial and highly marketable product that is environmentally safe.

SUMMARY OF THE INVENTION

In accordance with my invention activated sludge is employed for bioremediation of hydrocarbon-affected soil. The new process and product-by-process presented in this application combines activated sewage sludge with hydrocarbon-affected soils. By combining the two waste products and augmenting the micronutrient, biomass, and water content, soil bacteria digests the hydrocarbons, and treats the sludge by removing human pathogens.

This new and novel invention results in a marketable soil product that is economically viable while removing from the environmental concerns two waste products that most people skilled in the art have tried to treat individually in the prior art manner noted above.

DESCRIPTION OF THE PREFERRED EMBODIMENT

The invention, which may be understood without the aid of a drawing, relates to a method of recycling contaminated soil so as to form a balanced non-contaminated soil with an increased water-holding capability. More particularly the invention combines two waste products, namely hydrocarbon-affected soil and activated sewage sludge, in order to create a useful non-waste product having high marketability.

Activated sludge is high in carbon, nitrogen, phosphorous and water, and will aid in the proliferation of aerobic microbial decay of the hydrocarbon-affected soils. The combination of the two is inherently heat-producing and the heat that is produced further aids in the curative process of removing contaminants. Thus the combination in accordance with this invention eliminates the deleterious aspects of both waste ingredients in a new and novel manner.

Activated sludge, as is well known, has metal in it. Hydrocarbon-affected soil, on the other hand, has an affinity for metal. When the two are mixed in proper proportions, the hydrocarbon-affected soil will hold on to the metals which are found in objectionable levels in activated sludge. The combined mix has an increased bulk which has an acceptable metal level.

A well known Cation Exchange Capacity ("CEC") as determined by the USEPA is applicable to the teachings of this invention. A CEC value has been set forth in order to determine the maximum allowable rate of application of dry activated sludge to agricultural soil. It is well known that USEPA tables and procedures exist for specifying acceptable Cation Exchange Capacity and those known procedures may be applied to this invention.

In particular, soils engineers will recognize that several sections of the USEPA Process Design Manual, entitled "Land Application of Municipal Sludge", dated October 1983 will apply to the calculations and practical limits for the amount of activated sludge to be combined (mixed) with hydrocarbon-affected soil. At this point, in accordance with the Manual of Patent Examining Procedure, §608.01 (p) I hereby incorporate certain specific sections of the above-noted USEPA Manual into my disclosure for sake of completeness. Incorporated herein as though set out in full are Section 6, pages 6–1 through 6–78, Section 10 pages 10–27 through 10–50 and Appendices B1 and C1.

The above-noted sections of the Manual suggests certain limits for the addition of activated sludge (dry weight) to various type of soils including agricultural, forest, reclamation, and remediation soil sites. When a soils engineer in the environmental field is dealing with dry weight sludge, those values and discussion about them are helpful as guides in determining acceptable amounts of activated sludge to combine with such soils.

As an example of the above, CEC and associated environmental guide lines have been set in the Manual in order to define the recommended cumulative limits for metals that may be applied to agricultural lands. Such limits are given in table form in the above-noted Manual. Also supplied in that Manual are associated tables and formulas that may be utilized, based upon a measured value for Cation Exchange Capacity, to compute the dry tons of sludge that can be added per acre of agricultural soil.

Such tables and formulas are well known and do not require any further description at this time. Suffice it to say that such material from the Manual may be reviewed and will be self explanatory to those of ordinary skill in this art. Such data, which sets limits for dry sludge application to agricultural soil, is equally applicable for determining on a case-by-case basis the tons per acre of sludge (biomass and water, etc.) that may be combined with hydrocarbon-affected soil in accordance with my invention.

My experiments have shown that a typical amount of sludge (biomass and water) can safely be combined with hydrocarbon-affected soil to yield a highly marketable end product. The two wastes in proper ratios are combined together and the process eliminates a harmful effect from the activated sludge while improving the hydrocarbon-affected soil. Additional micro-nutrients are added into the combined mixture in order to obtain optimum concentrations of moisture and nutrients as needed for good useable soil.

Existing USEPA guide lines are useful for determining rates of acceptable sludge application to hydrocarbon-affected soil in accordance with my invention and general values for sludge per hydrocarbon-affected soil will now be given.

Activated sludge physically consists, in typical cases, of approximately 86% water and 14% biomass. In the field, the sludge is in a semi-solid state due to the addition of a polymer (inert and non-toxic plastic) in the drying process. Because of the consistency of the sludge, it is well suited to spreading and disking into the hydrocarbon-affected soils. Many formulas of the USEPA refer to dry sludge but in this invention there is no need to dry the sludge since it can readily and safely be mixed to hydrocarbon-affected soil in its waterbiomass state.

Unless noted otherwise, I hereinafter refer to activated sludge in its waterbiomass state. The limiting factors for the application rate of activated sludge to hydrocarbon-affected soil in a land application are; (1) the maximum amount of metal suggested for application to agricultural soils in accordance with local and state regulations and guidelines, and (2) the maximum nitrogen loading rate based on hydro-geologic site conditions.

Although amounts vary, the typical hydrocarbon-affected land application of my invention will mix approximately 1500 tons of activated sludge (biomass and water) per acre furrow slice (1 acre, 0.5 feet deep) of hydrocarbon-affected soil. Thus, as a practical matter of mixing, it is suggested that about six inches of hydrocarbon-affected soil be laid down, and then about 1500 tons of activated sludge should be disked into that initial layer. Obviously additional layers, one after the other, may be disked together. The exact amount of activated sludge which is to be combined with hydrocarbon-affected soil will be determined on a case-by-case basis relying upon tests done on both activated sludge and hydrocarbon-affected soil.

In keeping with that case by case approach, it must be noted that the range of application of sludge to hydrocarbon-affected soil is in the order of 1 to 1500 tons/acre of sludge to hydrocarbon-affected soil depending primarily on the amount of metal in the activated sludge. In a conceptual manner one should understand that activated sludge by weight may conveniently be added in a ratio of about one part sludge to about two to three or more parts by weight to hydrocarbon-affected soils.

A product, made in accordance with my invention, is quite simply done by using abandoned clay, quarry or similar type pit which acts as a large mixing bowl. The activated sewage sludge is brought into the pit along with the hydrocarbon-affected soil in correct proportions based upon a preliminary sample analysis of each component.

Sludge should be tested for the following constituents:

| | |
|---|---|
| Total Kjeldahl Nitrogen | Total Organic Nitrogen |
| Total Ammonia | Total Nitrate |
| Total Aluminum | Total Cadmium |
| Total Chromium | Total Copper |
| Total Iron | Total Lead |
| Total Manganese | Total Magnesium |
| Total Mercury | Total Nickel |
| Total Potassium | Total Zinc |
| Percent Solids | Percent Volatile |
| Suspended Solids | Dissolved Solids |
| Total PCBs | Total Coliform |
| Fecal Coliform | pH |
| TOC | COD |
| Pheno 1 | Phosphorus |
| Oil & Grease | Density |
| Chlorides | Semi-volatile |

At this point it is believed helpful to set forth some typical sludge characteristics, and some site characteristics, and explain how one goes about determining the amount of dry sludge that may be added to agricultural land in keeping with known standards of the USEPA. Table 1 below has been adapted from Table 6-1 in the USEPA Process Design Manual entitled "Land Application of Municipal Sludge" October 1983. The term "meq" in Table 1 stands for the Cation Exchange Capacity and it is a measured value. State regulatory values may vary from those given in Table 1; but Table 1 is representative and is believed to be helpful in promoting a clearer understanding on my invention.

TABLE 1

| | Recommended Cumulative Limits For Metals | | |
|---|---|---|---|
| | <5 | 5 to 15 | >15 |
| | Soil Cation Exchange Capacity, meq/100 gram | | |
| Metal | (lb/ac) | | |
| Lead (Pb) | 500 | 1,000 | 2,000 |
| Zinc (Zn) | 250 | 500 | 1,000 |
| Copper (Cu) | 125 | 250 | 500 |
| Nickel (Ni) | 125 | 250 | 500 |
| Cadmium (Cd) | 4.4 | 8.9 | 17.8 |

We will now describe an example of land application calculations using Table 1 in a typical case. An analytical test for the sludge supplies its characteristics. The sludge characteristics, in this example, are as follows:

| | | |
|---|---|---|
| Ph - 6.5 | Total Pb | 0.7 mg/kg |
| Total K. Nitrogen - 1.1% | Total Zn, | 160 mg/kg |
| Total Organic Carbon - 23% | Total Cu | 160 mg/kg |
| Total Phosphorus - .17% | Total Ni | 22 mg/kg |
| | Total Cd | 1.1 mg/kg |

We likewise supply characteristics for a typical site. These characteristics are as follows:
Location: Western State
Area: 2 acres
Soil Ph: 7.8
Soil CEC >15 meq/100 grams
Soil Permeability: 0. 2 cm/hr
Depth to Ground Water: >50 ft
Annual Precipitation: 28 in With such data in hand, we can now determine by use of the Manual a calculation of the maximum sludge application rate based on metal loadings. The above-noted Manual suggests cumulative limits for metals applied to agricultural cropland as a function of soil CEC. For soil CEC in the range of greater than 15 meq/100 gram the following cumulative limits are recommended:

|           |             |
|-----------|-------------|
| Lead (Pb) | 2,000 lb/ac |
| Zinc (Zn) | 1,000 lb/ac |
| Copper (Cu) | 500 lb/ac |
| Nickel (Ni) | 500 lb/ac |
| Cd        | 17.8 lb/ac  |

These values are now applied in well known formulas from the Manual as follows:

Dry Ton Sludge per acre =

$$\frac{\text{lb metal allowed (per USEPA Manual)}}{\text{mg (metal)/kg in sludge} \times 0.001} \times 0.4$$

We may now compute for copper:

Dry Tons Sludge per acre =

$$\frac{500 \text{ lb/ac}}{(160 \text{ mg/kg})(0.001)} \times 0.4 = 1,250 \text{ tons/acre}$$

Using similar calculations based upon tests and formulas, the loading limits for all of the metals are computed as follows:

| Metal | Maximum Application rate tons per acre |
|-------|----------------------------------------|
| Pb    | 1,066,666 |
| Zn    | 2,500 |
| Cu    | 1,250 |
| Ni    | 9,091 |
| Cd    | 5,884 |

Copper, having the lowest value, is the limiting metal in this case. Thus, the maximum amount of sludge which may be applied to each acre of agricultural soil is about 1,250 dry tons. This example has an unusually high application rate based upon metal concentrations because the treatment plant is in a rural area.

The regulatory agency may elect to limit nitrate concentration in the percolate from the site which can be calculated by (1) calculating the available nitrogen added by the sludge application, (2) subtracting the estimated nitrogen uptake by the vegetation and other biological nitrogen losses, and (3) calculating the maximum potential concentration of nitrates percolating from the site into the underlying aquifer. Depending upon site conditions and annual rainfall, it is possible that the calculated concentration of nitrate in the percolate is unacceptable to the regulatory agency and the nitrate concentration may be the restricting constituent for the sludge application.

In accordance with the invention, the hydrocarbon-affected soil will first be tested to determine its characteristics. Hydrocarbon-affected soils tests will include the following:

| | |
|---|---|
| Total Kjeldahl Nitrogen | Total Organic Nitrogen |
| Total Ammonia | Total Nitrate |
| Total Aluminum | Total Cadmium |
| Total Chromium | Total Copper |
| Total Iron | Total Lead |

-continued

| | |
|---|---|
| Total Manganese | Total Magnesium |
| Total Mercury | Total Nickel |
| Total Potassium | Total Zinc |
| Total PCBs | pH |
| Phenol | Phosphorus |
| Oil & Grease | Volatile |
| Gasoline & Diesel | Semi-volatile |
| Toxicity Testing Criteria | Soil Texture |
| Soil Permeability | C:N Ratio |
| Cation Exchange Capacity | Lime Requirement |

Activated sewage sludge is brought into the pit along with the petroleum (hydrocarbon)-affected soil in correct proportions based upon a preliminary sample analysis of each component. The combining or mixing step is quite simply done by using an abandoned clay or quarry pit which acts as a large mixing bowl. Conventional mixing equipment mixes correct proportions of each waste product and that mixing of thermophylic bacteria causes the core heat necessary for increased organic activity to purify the contaminants in the two components.

The typical biologically treatable hydrocarbon concentrations range from about 1 part per million to more than 10% hydrocarbon compounds by weight. Application of activated sludge to hydrocarbon-affected soil benefits the remediation process by:

Increasing oxygenation of the soils through particle separation;
Increasing the moisture holding ability of the soils;
Increasing the number and activity of soil microorganisms:
Increasing the micro-nutrients in the soils;
Increasing the soil Cation Exchange Capacity; and
Increasing the core temperature of the hydrocarbon-affected soils.

When properly mixed the two (activated sludge and hydrocarbon-affected soil) are going to dry out and decrease in volume. Other nutrients, however, such as straw, filler, and the like are added (as shown by preliminary soil analysis) so that the total treated amount when processed may be increased over the two primary components. This is recycling at a beneficial rate, purpose and with unusual results in that two waste products are self-purifying to a large degree and a marketable product results.

Local facility permitting restraints may require the hydrocarbon-affected soil to be non-hazardous. Hazardous waste is characterized by several physical parameters including corrosivity, ignitability, reactivity, toxicity, or environmental persistency.

If a solid waste can pass the Hazardous Characteristics testing detailed in 40 CFR, then the waste is not hazardous and is suitable for treatment at an approved site. If the hydrocarbon-affected soils are shown to be hazardous, the process must be applied at a USEPA-approved Treatment, Storage and Disposal Facility (TSDF). The limiting factor for effective biologic treatment of hydrocarbon-affected soils is toxicity to the degrading microorganisms.

The application of my process to composting is very much along the lines described above. Limiting factors for the application rate of activated sludge to hydrocarbon-affected soil in a composting application are; (1) the maximum amount of metal suggested for application to agricultural soils in accordance with local and state regulations and guidelines, (2) the maximum nitrogen loading rate based on hydro-geologic site conditions; and (3) the physical properties of the hydrocarbon-affected soil including porosity, permeability, nutrients (particularly Carbon and Nitrogen), ph and Cation Exchange Capacity.

Although amounts vary, the typical composting application will mix approximately three (3) tons hydrocarbon-affected soil to one (1) ton of activated sludge (biomass and water) within a range of 1 to 4 parts soil to sludge in order to increase the biologic degradation of the contaminates. The sludge will be both mixed with, and covered (insulated by), hydrocarbon-affected soil. The hydrocarbon-affected soil acts as a bulking agent and an insulating agent for the compost.

For composting, the combining or mixing step is quite simply done by using a cement-lined sludge storage pond at a composting facility which acts as a mixing bowl. As with the land application, the hydrocarbon-affected soil is brought into the pond along with the activated sewage sludge. The correct proportion is based upon a preliminary sample analysis of each component.

Conventional mixing equipment mixes the correct proportions of each waste product and such mixing allows for decreased moisture content, increased permeability, and an optimization of carbon to nitrogen ratio for the compost. Sludge supplies increased organic activity which purifies the contaminants during composting of the two components. If the soil has a high clay content, additional bulking agents will be necessary to obtain adequate permeability of the soil prior to composting.

A soil cap of hydrocarbon-affected soil will be placed from about 0.5 to 1.0 foot thick over the composting pile in order to insulate the remediation efforts. This soil cap presents another advantage for this invention in that the cap holds in the heat as the compost is being treated by the heat that is being formed. The cap thus adds a heat retaining step to the curing process. That insulation cap is also mixed into the compost when the curative process is almost complete in order to increase the yield of useable humus.

While I have described my invention by the best mode as presently known, my invention is, however, susceptible to modifications and alternate configurations without departing from the spirit and scope of my invention as described above. Consequently, it is not the intention to limit the invention to the particular embodiments as disclosed. On the contrary, the invention is intended to cover all modifications, sizes, and alternate constructions falling within the spirit and scope of the invention as expressed in the appended claims when read in light of the description.

What is claimed is:

1. A method of recycling two waste products, namely hydrocarbon-affected soil and activated sewage sludge, in order to form a balanced non-contaminated soil, said recycling method comprising the steps of:
    obtaining a test sample from activated sewage sludge in a semi-solid state characterized as including a substantial amount of water and about twenty percent biomass;
    determining from the test sample so obtained the weight of biomass as represented generally in the semi-solid activated sewage sludge;
    selecting individual amounts in bulk of hydrocarbon-affected soil and semi-solid activated sewage sludge (biomass and water) in accordance with a weight ratio ranging from about three to one to about one to one of hydrocarbon-affected soil to activated sewage sludge biomass (dry weight);
    combining the selected bulk amounts of hydrocarbon-affected soil and semi-solid activated sewage sludge in accordance with a weight ratio within the designated range into a mixture formed from these two waste products;
    allowing the core temperature of the combined mixture to increase as bacteria in the activated sewage sludge attack the contaminants in the hydrocarbon-affected soil and soil bacteria in the hydrocarbon-affected soil attack pathogens in the activated sewage sludge;
    aerating the combined mixture until contaminants in the two waste products are neutralized by aerobic biologic action; and
    recovering a purified non-contaminated soil from the neutralized mixture.

2. The method of claim 1 and including the further steps of:
    testing semi-solid activated sludge for amounts of carbon, nitrogen, phosphorous and water; and
    adjusting the carbon, nitrogen, pH and phosphorous in the mixture in order to aid in the proliferation of aerobic microbial decay of the hydrocarbon-affected soil.

3. The method of claim 2 and including the further step of:
    adding micro-nutrients to the bulk mixture in order to obtain optimum concentrations of moisture and nutrients to aid in the proliferation of aerobic microbial decay of said contaminants.

4. The method of claim 2 wherein activated sludge physically consists of approximately 70% to 90% water and 30% to 10% biomass in a semi-solid state, and including the further step of:
    spreading semi-solid activated sludge and hydrocarbon-affected soil together; and
    mixing the semi-solid activated sludge into the hydrocarbon-affected soil.

5. The method of soil treatment in accordance with claim 4 wherein the limiting factor for the addition of semi-solid activated sludge to the hydrocarbon-affected soils is controlled by the maximum amount of metal suggested for application to agricultural soils in accordance with applicable regulations and guidelines, and further wherein:
    the mixing step includes a ratio of approximately three to one (by weight) of hydrocarbon-affected soil to the dry weight of biomass in the semi-solid activated sludge as determined by the sampling step.

6. The method of soil treatment in accordance with claim 5 and including the further step, of:
    requiring the hydrocarbon-affected soil to be in a non-hazardous state as determined by such characteristics as corrosivity, ignitability, reactivity, toxicity, and/or environmental persistency.

7. The method of soil treatment in accordance with claim 6 and including, the further step of:
    selecting the biologically treatable hydrocarbon concentrations in a range determined as from about 1 part per million to more than 10% hydrocarbon compounds by weight.

8. The method of soil treatment in accordance with claim 1 wherein the application of activated sludge to hydrocarbon-affected soil benefits the remediation process by including, the further steps of:

- increasing oxygenation of the soil by particle separation;
- increasing the moisture holding ability of the soils; and
- increasing the micro-nutrients in the soils by selectively adding micro-nutrients to the mixture.

9. An aerobic composting application for providing a useable humus comprising the steps of:

- mixing hydrocarbon-affected soil as a bulking agent with semi-solid activated sludge (biomass and water) in approximately equal proportions; and
- allowing thermophylic aerobic bacteria in the semi-solid activated sewage sludge to heat the core temperature of the mixture and thus increase the biologic activity of the naturally-occurring soil bacteria;
- further allowing bacteria in the activated sewage sludge to attack the contaminants in the hydrocarbon-affected soil and soil bacteria in the hydrocarbon-affected soil to attack pathogens in the activated sewage sludge; and
- recovering a purified useable humus from the mixture.

10. A composting application in accordance with claim 9, and said mixing step is further characterized by:

- mixing approximately three (3) tons hydrocarbon-affected soil to about one (1) dry ton of activated sludge.

11. A composting application in accordance with claim 10 and further characterized in that said mixing step is further characterized by:

- using a lined sludge storage pond at a composting facility which acts as a mixing cell.

12. A composting application in accordance with claim 9 and further characterized in that said mixing step is further characterized by:

- hydrocarbon-affected soil acting as a bulking agent; and
- the amount of said soil is selected within a weight ratio range of about 1 to 4 parts soil to the dry weight amount of sludge.

13. A composting application in accordance with claim 12 and further characterized in that said mixing step is further characterized by:

- increasing the biologic degradation of the contaminates by covering the mixture of soil and sludge with a layer of hydrocarbon-affected soil which acts as a bulking agent and an insulating agent for the compost.

14. A composting application in accordance with claim 13 and further characterized in that said insulating step includes:

- a soil cap of hydrocarbon-affected soil of about one-half to one foot thick over the composting pile.

15. A composting application in accordance with claim 14 and further characterized in that the soil cap holds in heat as the compost is being treated by the heat it is forming, and said process further includes:

- mixing the insulation cap into the compost in order to complete the curative process and thus increase the yield of useable humus.

* * * * *